*L. Smith,*
*Making Sheet-Metal Vessels.*
*Nº 5,083.   Patented Apr. 24, 1847.*
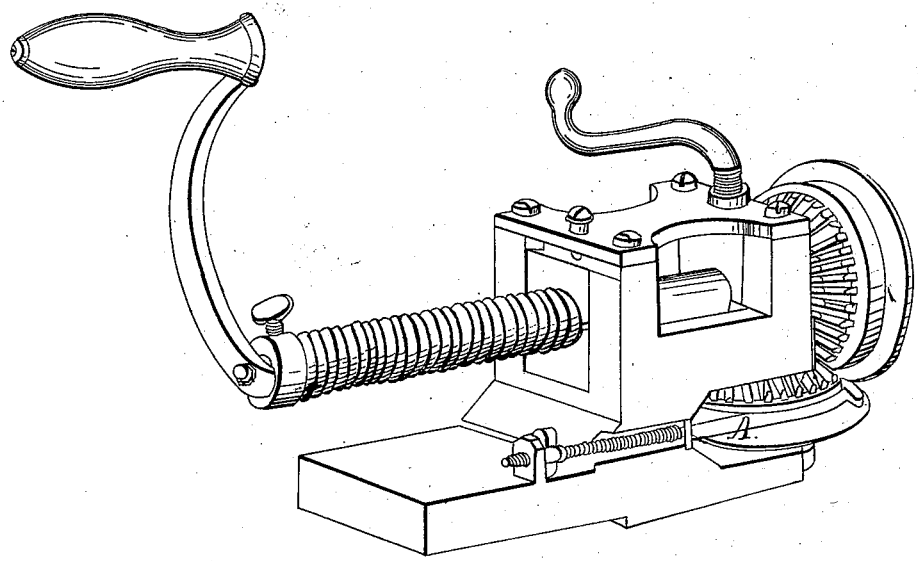
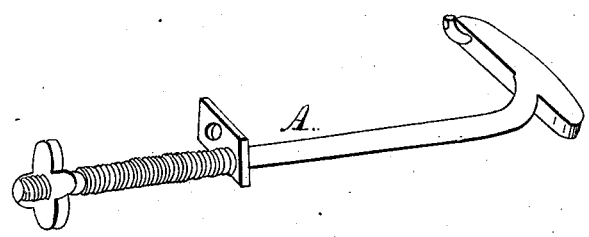

UNITED STATES PATENT OFFICE.

LESTER SMITH, OF SOUTHINGTON, CONNECTICUT.

IMPROVEMENT IN SETTING-DOWN MACHINES FOR THE MANUFACTURE OF TINWARE.

Specification forming part of Letters Patent No. 5,083, dated April 24, 1847.

*To all whom it may concern:*

Be it known that I, LESTER SMITH, of Southington, in the county of Hartford and State of Connecticut, have invented a new and useful Improvement in Setting-Down Machines for the Manufacture of Tin, Brass, and Copper Ware, &c.; and I do hereby declare that the following is a full and exact description.

I construct the main body of the machine in any of known forms which are in common use. The roller to which the crank is attached is made with a screw on one end, to which are fitted two or more wheels of different thickness, in order to suit the various widths of seams which the different kinds and sizes of ware may contain. The under roller (the shaft of which stands in a vertical position) is turned without the shoulder near the outside, it being left straight and smooth, and on this roller is placed a movable gage, A, to which is attached a screw, and by turning said screw and putting a wheel of suitable thickness on the upper shaft the machine is easily adjusted to any required work or width of seam.

What I claim as my invention, and desire to secure by Letters Patent, is—

The application of a movable gage, in combination with two or more different thicknesses of wheels to be attached to the common setting-down machine, and by shifting the wheels or rollers and moving the gage the machine is readily adjusted to any required width of seam.

LESTER SMITH.

Witnesses:
 DANIEL NEWTON,
 NATHAN E. STANNARD.